US011753963B2

(12) United States Patent
Adam et al.

(10) Patent No.: US 11,753,963 B2
(45) Date of Patent: Sep. 12, 2023

(54) METHOD FOR REPAIRING IN-SITU INSTALLATIONS INSIDE A COMPRESSOR REAR FRAME CASE OF A GAS TURBINE

(71) Applicant: General Electric Company, Schenectady, NY (US)

(72) Inventors: Virgil Adam, Arnhem (NL); Glenn L Knight, III, Cincinnati, OH (US); Wiebe Van Der Werff, Arnhem (NL); Valerio Goffi, Florence (IT); Willem Smit, Ede (NL)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 16/997,151

(22) Filed: Aug. 19, 2020

(65) Prior Publication Data

US 2020/0378272 A1 Dec. 3, 2020

(30) Foreign Application Priority Data

Apr. 24, 2018 (EP) ..................................... 18425031

(51) Int. Cl.
*B23P 6/00* (2006.01)
*F01D 25/18* (2006.01)
*B23P 19/04* (2006.01)

(52) U.S. Cl.
CPC ............ *F01D 25/18* (2013.01); *B23P 19/042* (2013.01); *B23P 6/005* (2013.01); *F05D 2230/80* (2013.01); *F05D 2260/98* (2013.01)

(58) Field of Classification Search
CPC ...... B23P 6/002; B23P 6/005; F05D 2230/72; F05D 2230/80; F05D 2230/70; F05D 2230/60; F05D 2230/51; F05D 2230/52
See application file for complete search history.

(56) References Cited

U.S. PATENT DOCUMENTS

| 3,528,241 | A | 9/1970 | Venable et al. |
| 7,827,686 | B2 * | 11/2010 | Burmeister ............. F01D 5/005 29/430 |
| 9,259,807 | B2 * | 2/2016 | Means .................... B23P 6/005 |

FOREIGN PATENT DOCUMENTS

| EP | 2657463 A1 | 10/2013 |
| EP | 3165719 A1 | 10/2017 |
| WO | 2014134513 A1 | 4/2014 |

OTHER PUBLICATIONS

EP Search Report, EP Application No. 18425031.4, dated Jan. 16, 2019, 4 pages.

* cited by examiner

*Primary Examiner* — Christopher J Besler
(74) *Attorney, Agent, or Firm* — James Pemrick; Charlotte Wilson; Hoffman Warnick LLC

(57) ABSTRACT

A method for repairing in-situ an oil manifold of the aft end bearing assembly of a gas turbine is provided that is cost-efficient, effective and dramatically reduces the costs for repair of a leaking oil manifold.

20 Claims, 8 Drawing Sheets

METHOD FOR REPAIRING IN-SITU INSTALLATIONS INSIDE A COMPRESSOR REAR FRAME CASE OF A GAS TURBINE

BACKGROUND

Gas turbines may be separated into several sub-assemblies such as a compressor, a combustor and a turbine. Between the compressor and the turbine the compressor rear frame (CRF) case is located. Inside the CRF case among other components and installations the combustor, a front end bearing housing and an aft end bearing housing are located. In some gas turbines the front end bearing housing comprises at least one axial bearing and one radial bearing, wherein the aft end bearing housing comprises at least one radial bearing and no axial bearing.

The compressor comprises a rotor with a bearing journal at least on the outlet end of the compressor that is born by the bearings inside the front end bearing housing.

The turbine comprises a rotor with a bearing journal on at least the inlet end of the rotor that is born by the at least one bearing in the aft end bearing housing.

The bearings inside the front end bearing housing and the bearings inside the aft end bearing housing require an appropriate oil supply. The aft end bearing housing may be supplied with vent air and pressurized air by means of an air supply and may be connected to an oil scavenge line.

The oil manifold is comprised of several bent tubes and appropriate fittings such that the oil is distributed in an appropriate manner to the bearing housings. During operation of the gas turbine the oil manifold and a lot of other components of the gas turbine are exposed to mechanical stress due to temperature changes and vibrations. As a result, it sometimes happens that one or several tubes of the oil manifolds break or get damaged such that oil leaks from the oil manifold. This is not acceptable for several reasons: Leakage of the oil manifold may result in a poor oil supply of the bearings inside the front bearing housing and/or the aft end bearing housing. This may cause instant damages of the bearings and/or reduce their service life dramatically. Additionally, a leaking manifold allows oil to enter the CRF in an "intended dry area" where it causes oil leakage in an area outside if the gas turbine and subsequent fire hazard.

In case the oil manifold of the aft end bearing housing breaks or leaks the turbine has to be stopped and the manifold has to be repaired or replaced. In conjunction with the claimed invention the terms "repair" and "replacement" are used as synonyms.

Until today repairing the oil manifold of the aft end bearing housing means that the complete gas turbine has to be shipped to the workshop of the manufacturer of the gas turbine since the oil manifold could only be replaced on the site of the manufacturer. Apparently shipping a complete gas turbine is very time consuming and extremely expensive.

SUMMARY

It is an object to avoid the expenses caused by a repair of the manifold on the site of the manufacturer of the gas turbine and to reduce the time required for repairing a broken oil manifold of the aft end bearing housing of a gas turbine.

This object is achieved by a method for repairing in-situ installations inside the compressor rear frame case of a gas turbine, such as for example an oil manifold, the gas turbine comprising a compressor, a combustor, and a turbine, a compressor rear frame case between the compressor and the turbine, wherein at least the combustor, a front end bearing housing, and an aft end bearing housing are located inside the compressor rear frame case, wherein the front end bearing housing and the aft end bearing housing together comprise at least one axial bearing and at least two radial bearings, wherein the compressor comprises a rotor with a bearing journal at least on the outlet end of the compressor that is born by the bearings inside the front end bearing housing, wherein the turbine comprises a rotor with a bearing journal on at least the inlet end of the rotor that is born by the at least one radial bearing in the aft end bearing housing, wherein the bearing journal at the outlet end of the compressor rotor and the bearing journal at the inlet end of the turbine rotor are detachably connected, and wherein an oil supply manifold is attached to the aft end bearing housing for supplying oil to the at least one bearing, the method comprising the steps of:

a) removing the turbine from the compressor rear frame case;

b) removing the aft end bearing housing from the compressor rear frame case;

c) removing the aft sump assembly from the compressor rear frame case;

d) removing the sump oil manifold, an oil supply and air tubes from the compressor rear frame case, and e) removing the sump closure and lube oil nozzle.

The general concept of the claimed invention is to repair the installations inside the compressor rear frame (CRF) case of a gas turbine, such as for example an oil manifold, without removing the compressor and the compressor rear frame case such that the manifold can be repaired in-situ at the power plant which extremely reduces the costs of such a repair and further reduces the time needed for this repair.

It is preferred but not compulsory if the front end bearing housing comprises at least one axial bearing.

The four steps a) to d) are executed at the gas turbine, wherein the last step e) can be already executed outside the CRF case and preferably on a work bench at the power plant site. This means that dismantling the turbine in part such that the oil manifold or any other broken or worn installation inside the CRF case can be repaired on the site of the power plant. In a next step the broken or worn installation inside the CRF case and/or the broken or leaking oil manifold is replaced in part or completely without shipping the complete gas turbine to the manufacturer site.

The steps of mounting a new installation inside the CRF case such as a new oil manifold and completing the gas turbine such that the gas turbine can be started again comprise the additional the steps of:

f) installing or mounting a new installation such as a new oil manifold to the aft sump assembly;

g) installing recoup tubes and brackets;

h) executing a leak check procedure for the new oil manifold;

i) installing the aft sump housing and the bearing closure;

j) installing the bearing housing to the CRF case; and k) installing the turbine to the CRF case.

Using the method described herein saves a lot of time for repairing a broken or worn installation inside the CRF case such as the oil manifold of the aft end bearing and extremely reduces the cost of that repair. The method described herein has been tested several times with a rate of success of 100%.

An embodiment of the gas turbine to which the method described herein may be applied is illustrated in the figures.

Since gas turbines are very large it is simply impossible to illustrate all details of a gas turbine in the following figures that are restricted to the space available. For the understanding of the method described herein it is not necessary to illustrate all design details of an embodiment of a gas turbine to which the method may be applied. This means, that FIGS. 1 to 7 are simplified illustrations of a gas turbine that do not show every detail thereof.

Figure 1:
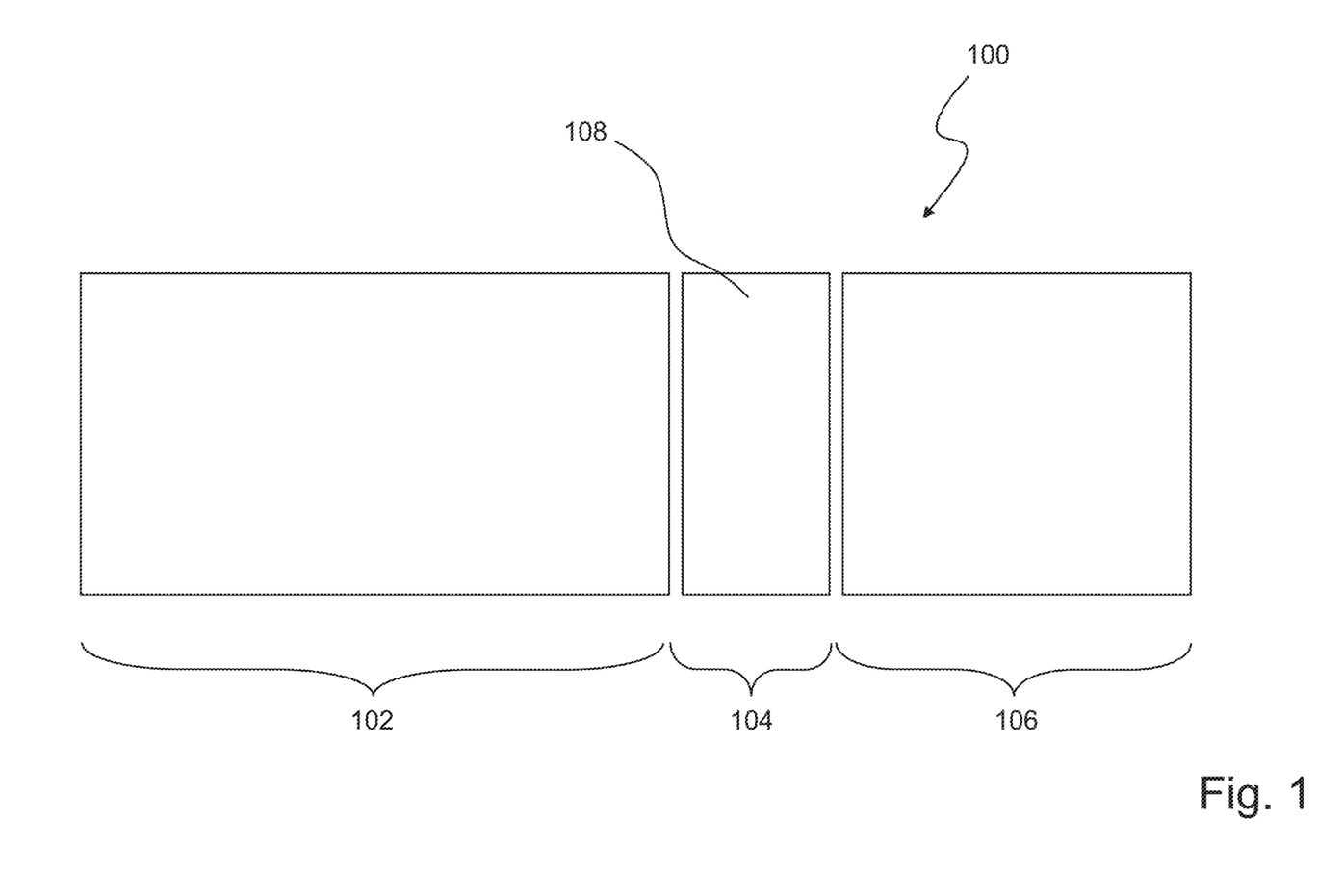
FIG. 1 is a schematic illustration of a gas turbine.

FIG. 1 shows in a schematic way the arrangement of the main components of a gas turbine 100. The major sub-assemblies of the gas turbine 100 are a compressor 102, a combustor 104 and a turbine 106. The compressor 102 may comprise a low pressure compressor LPC and a high pressure compressor HPC. For example, the low pressure compressor LPC may comprise 5 (five) stages and the high pressure compressor LPC may comprise 14 stages. The combustor 104 is located inside a compressor rear frame case 108 and between the compressor 102 and the turbine 106.

The compressor 102 comprises among other parts a rotor with a bearing journal (not illustrated). The turbine 106 comprises among other parts a bearing journal, which is not illustrated, too. The front end side of the CRF case 108 houses a front end bearing assembly (not shown). This front bearing assembly comprises among other components a front end bearing housing. This front end bearing housing is fitted into the CRF case 108 on the left side of the CRF case 108. The front end bearing assembly comprises a number of rings, bearings, seals and the like, which are not described in detail since these components are not part of the invention.

Figure 2:
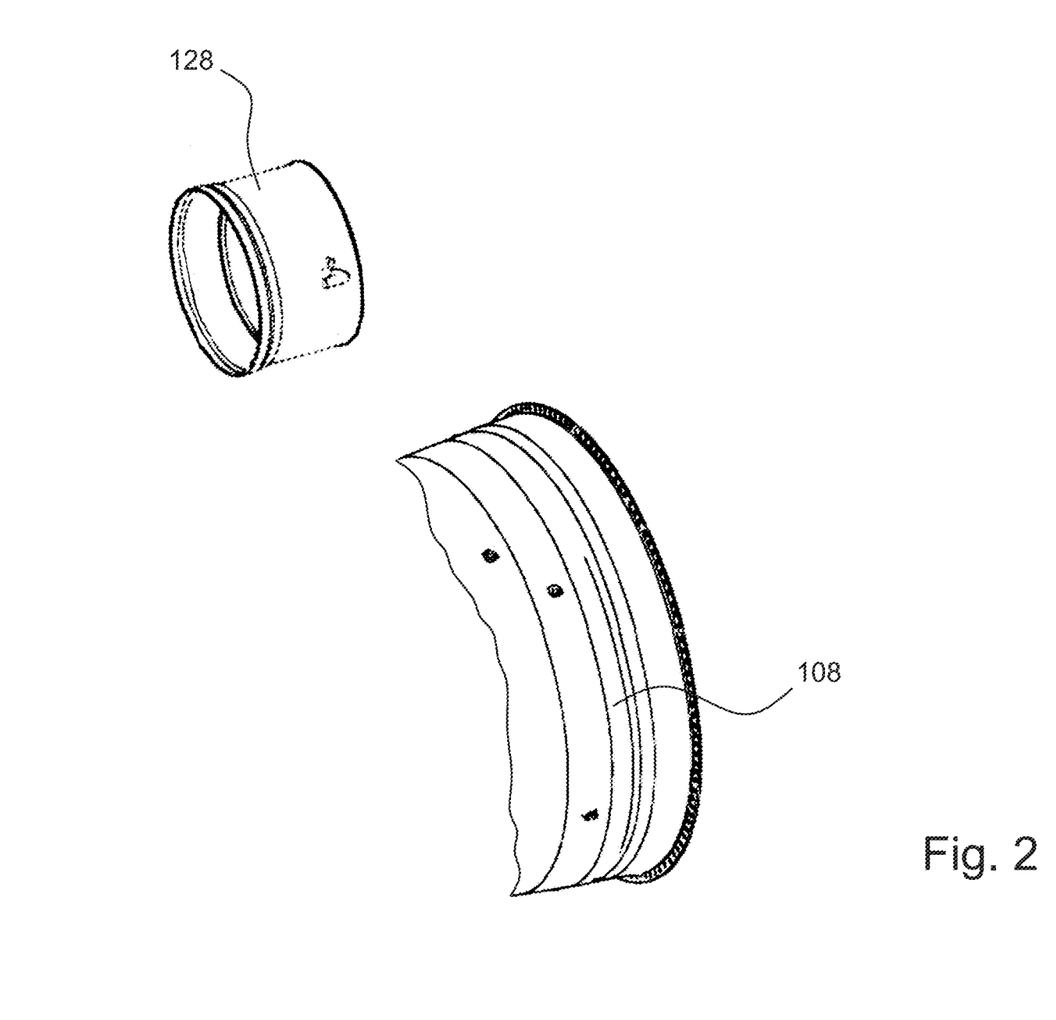
FIG. 2 illustrates a simplified exploded view of the compressor rear frame case.

FIG. 2 illustrates in an exploded view the CRF case 108 and an aft sump assembly 128.

Figure 3:
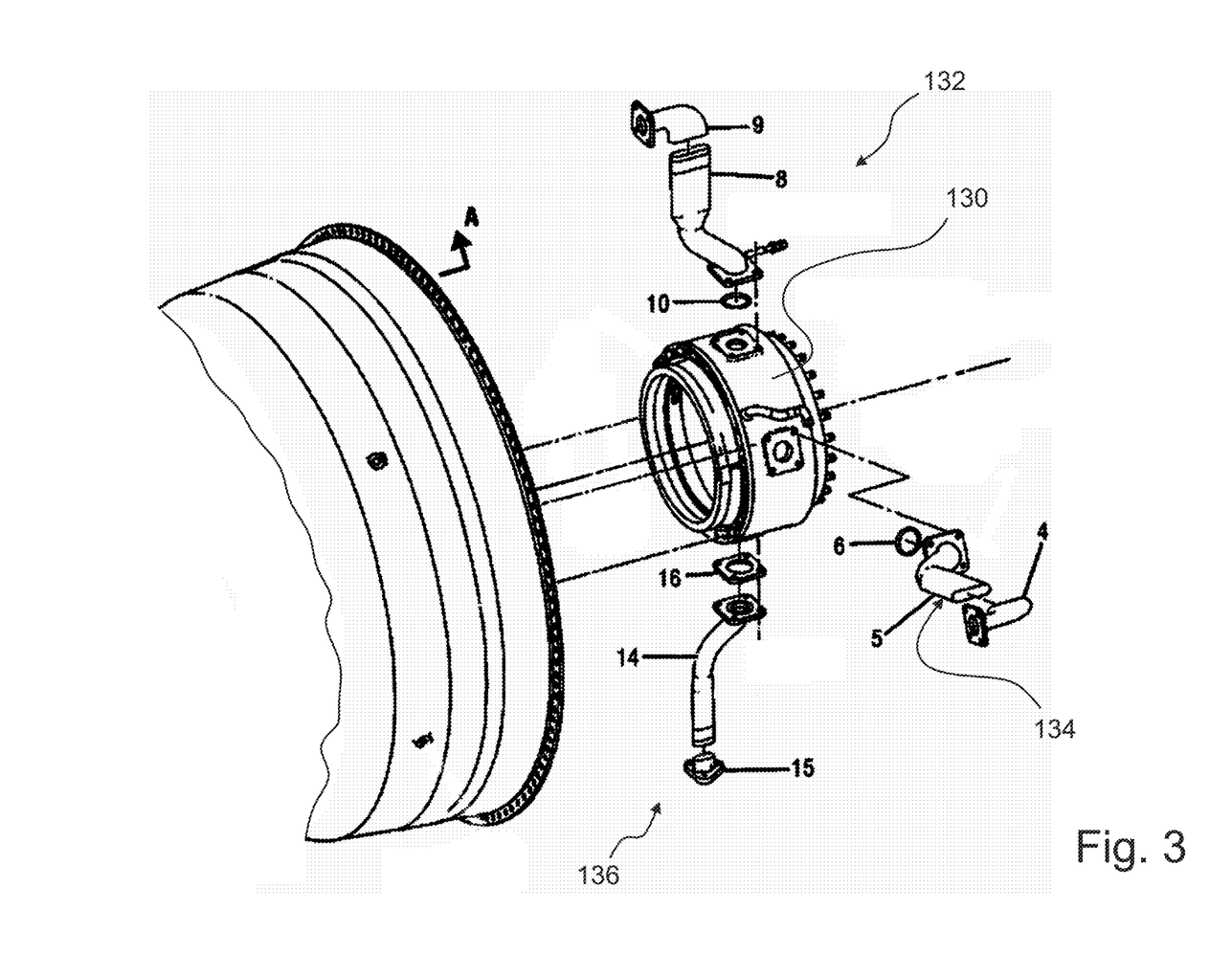
FIG. 3 illustrates a simplified exploded view showing the forward sump housing that is installed in the aft end of the compressor rear frame case.

FIG. 3 illustrates a part of the aft end bearing assembly that is located on the right end side of the CRF case 108. For clarity only those components of the aft end bearing assembly are shown that are important for the understanding of the method. One of the important components of the aft end bearing assembly is the forward sump housing 130. As can be seen from FIG. 3 there are several lines connected to the forward sump housing 130 in an exploded view. The line comprised of the parts 8 and 9 is a vent line 132. The line comprised of the components 4 and 5 is an air supply that pressurizes several parts inside the forward sump housing 130 to avoid leakage of oil inside the forward sump housing 130.

The line 136 comprised of the parts 14 and 15 is an oil scavenge.

Figure 4:
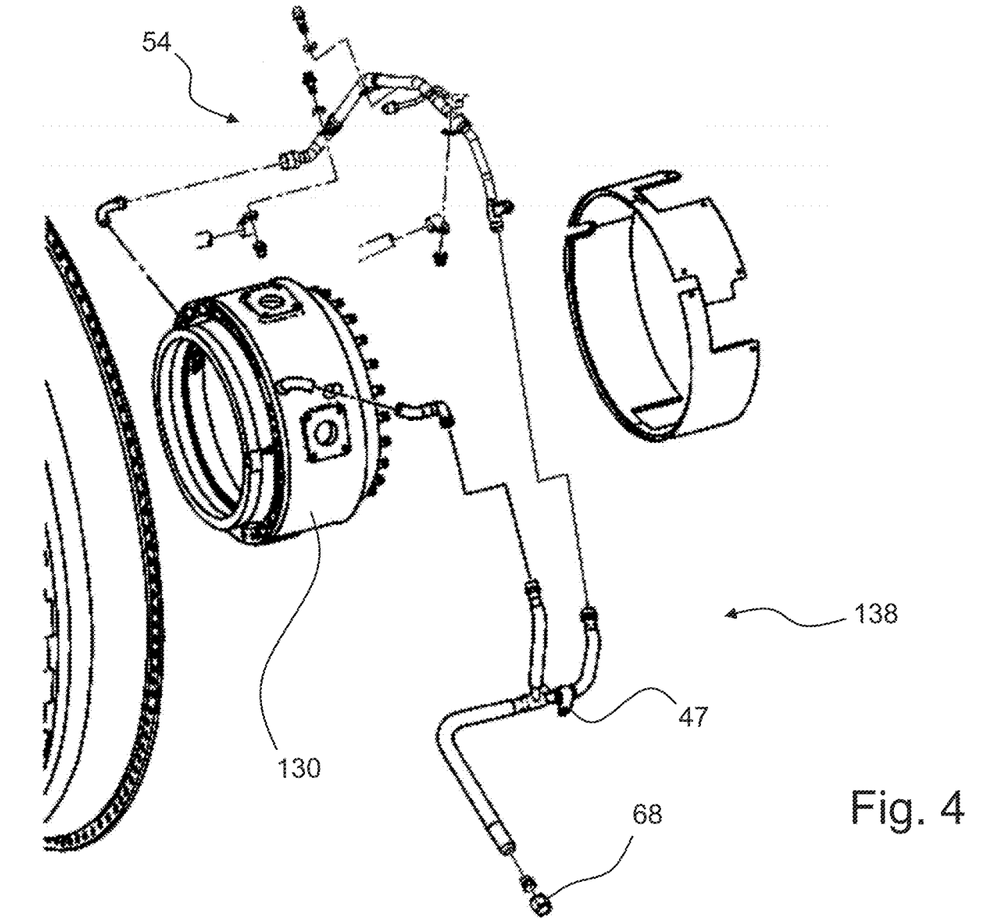
FIG. 4 illustrates an exploded view of the oil manifold fitted to the forward sump housing.

FIG. 4 illustrates some further components of the forward sump assembly, namely an oil manifold 138 that is attached and fluidly connected with the forward sump housing 130. In FIG. 4 the parts that are installed inside the forward sump housing 130, namely rings, nuts and bearings are not illustrated. The components inside the forward sump housing 130 are bearings, washers, rings seals and the like.

The oil manifold in its entirety bears the reference numeral 54. As can be seen from the exploded view in FIG. 4 the oil manifold 54 is comprised of several tubes (straight and bent), some brackets as well as fittings, sealing rings and other components.

The forward sump housing 130 and the oil manifold 54 once they are installed are located inside the CFRF case 108. The oil manifold 54 is on the outside of aft sump housing 140 (see FIG. 5).

A further manifold bears the reference numeral 138 comprising brackets (see for example reference numeral 47) as well as fittings, sealing rings and other components.

Other than the oil manifold 54 the further manifold 138 is not screwed to the forward sump housing 130, but connected by brazing. In case a tube of the further manifold 138 leaks it has to be replaced inside the CRF case 108.

The annular ring without a reference numeral comprising three segments is a thermal insulation ring.

During operation of the gas turbine the oil manifold 54 is exposed to temperature changes caused by the start of the gas turbine from ambient temperature to operating temperature and mechanical stress due to vibrations or pressure pulsations. Due to these vibrations and pulsations it sometimes happens that a tube of the oil manifold may break.

Further wear and tear of the oil manifold 54 may be caused by a thermal insulation (not shown in FIG. 4) that covers most of the oil manifold 54. The thermal insulation as well as the oil manifold 54 vibrate during operation of the gas turbine 100 such that a small relative and oscillating movement between the thermal insulation and the tubes of the oil manifold 54 may occur. This movement may cause abrasion on the tubes of the manifold such that the thickness of the tubes of the oil manifold is reduced and leakage occurs.

It is obvious, that once leakage in the oil manifold of the aft end bearing assembly occurs the gas turbine has to be stopped without delay and the oil manifold 54 has to be replaced or repaired.

Up to now this repairing the aft end oil manifold means that the complete gas turbine 100 has to be shipped to the manufacturer of the gas turbine 100 and the repair of the oil manifold 54 has to be executed on the site of the gas turbine manufacturer. It is evident that shipping a gas turbine from the power plant to the site of the gas turbine manufacturer is very time consuming and expensive.

The inventors have found a way to repair in-situ the oil manifold 54 of the aft end bearing assembly and/or many other installations inside the CRF case 108 of a gas turbine that are broken, damaged or worn. Repairing the oil manifold 54 in-situ means repairing without removing the CRF case 108 and the compressor 102 and without shipping the complete gas turbine to the manufacturer.

Figure 5:
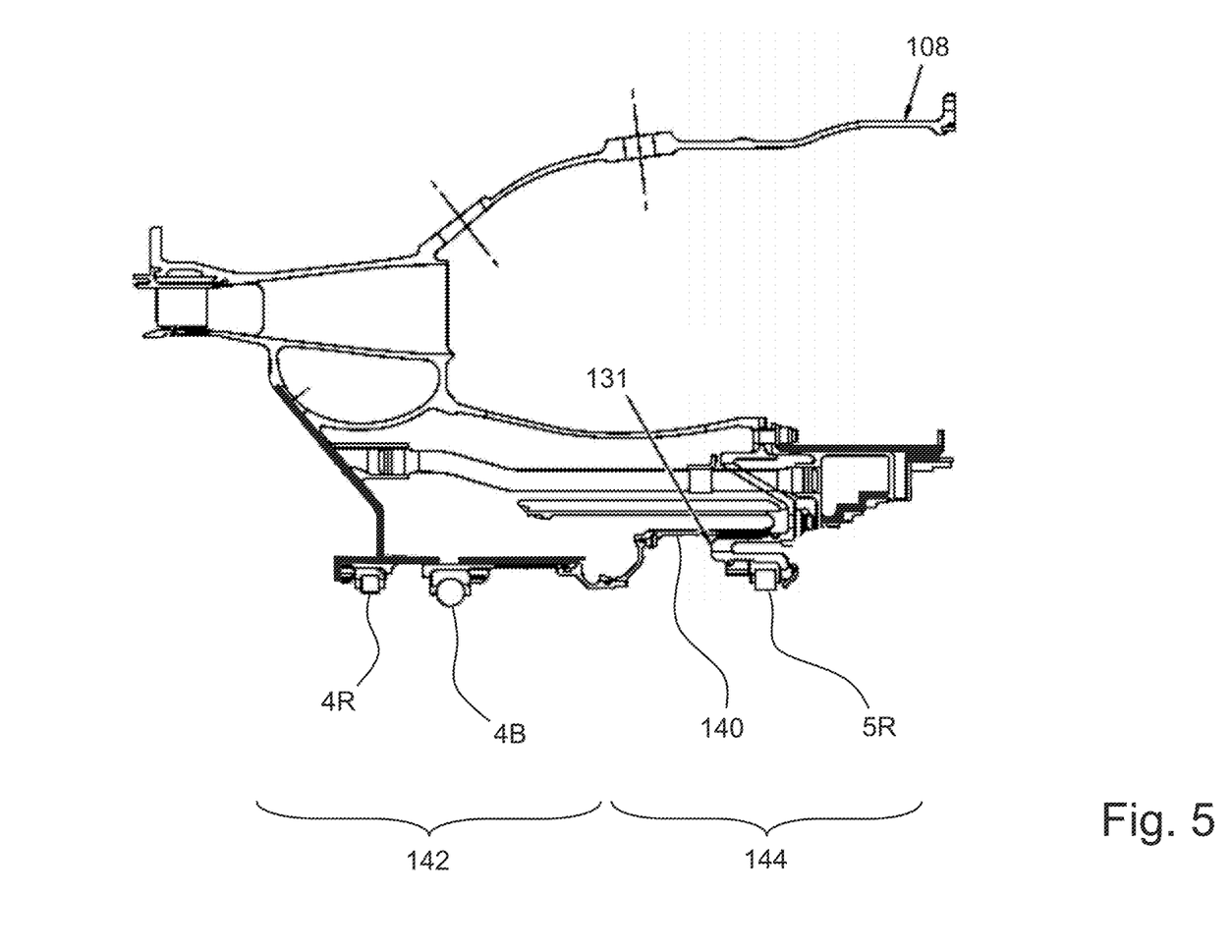
FIG. 5 illustrates a detailed cross-section of a part of the compressor rear frame case and the front bearing housing, a forward sub assembly, the aft end bearing housing, the aft sump assembly and some further components without the rotors of the compressor and the gas turbine.

FIG. 5 shows a simplified and partial cross-section of a CRF case 108. In this cross-section only a few of the components inside the CRF case 108 are illustrated and have reference numerals, since the details of the design are not important for an understanding of the method described herein. Therefore, attention is drawn to the fact, that in FIG. 5 the components that are part of the front end bearing assembly 142 are located on the left hand side and the components that are part of the aft end bearing assembly 144 are located on the right hand side of FIG. 5.

The front end bearing assembly 142 comprises among other components bearings 4R and 4B and the forward sump housing 130. The bearing 4R being a radial roller bearing, wherein the bearing 4B is an axial ball bearing.

The aft end bearing assembly 144 comprises among other components a roller bearing 5R and a bearing housing 131 of the bearing 5R.

The oil manifold 54 is not illustrated in FIG. 5. Further the compressor rotor and the turbine rotor are not illustrated for reasons of clarity.

During repair of the oil manifold 54 the front end bearing assembly 142 remains unchanged. Only some components of the aft end bearing assembly 144 are disassembled to be able to repair or replace a broken oil manifold 54 or any other broken, damaged or worn installation.

Among others the bearing 5R, the aft end bearing housing 130, and the aft end sump components of the aft end bearing assembly 144 have to be removed to get the oil manifold 54 out of the CRF case 108 and to be able to repair or replace the oil manifold 54. The same applies with regard to other installations inside the CRF case 108 that are broken, damaged or worn and thus have to be repaired or replaced.

In subsequent steps all the above mentioned installations that have been removed from the CRF case 108 have to be reinstalled and in a last step the gas turbine is reinstalled such that the gas turbine is ready to run.

Figure 6:
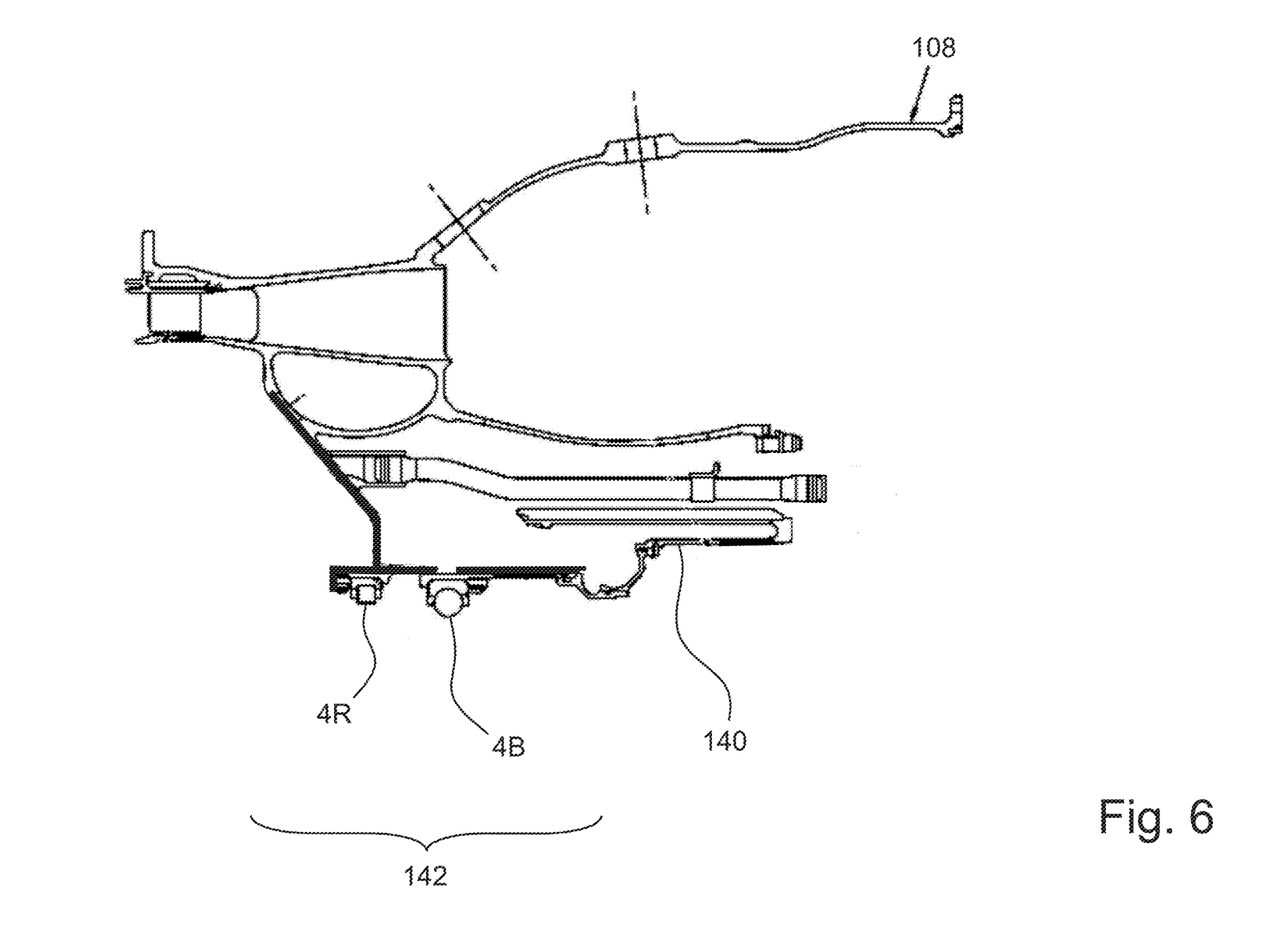
FIGS. 6 and 7 illustrate different statuses of disassembling parts from the aft end of the CRF case shown in FIG. 5.
Figure 7:
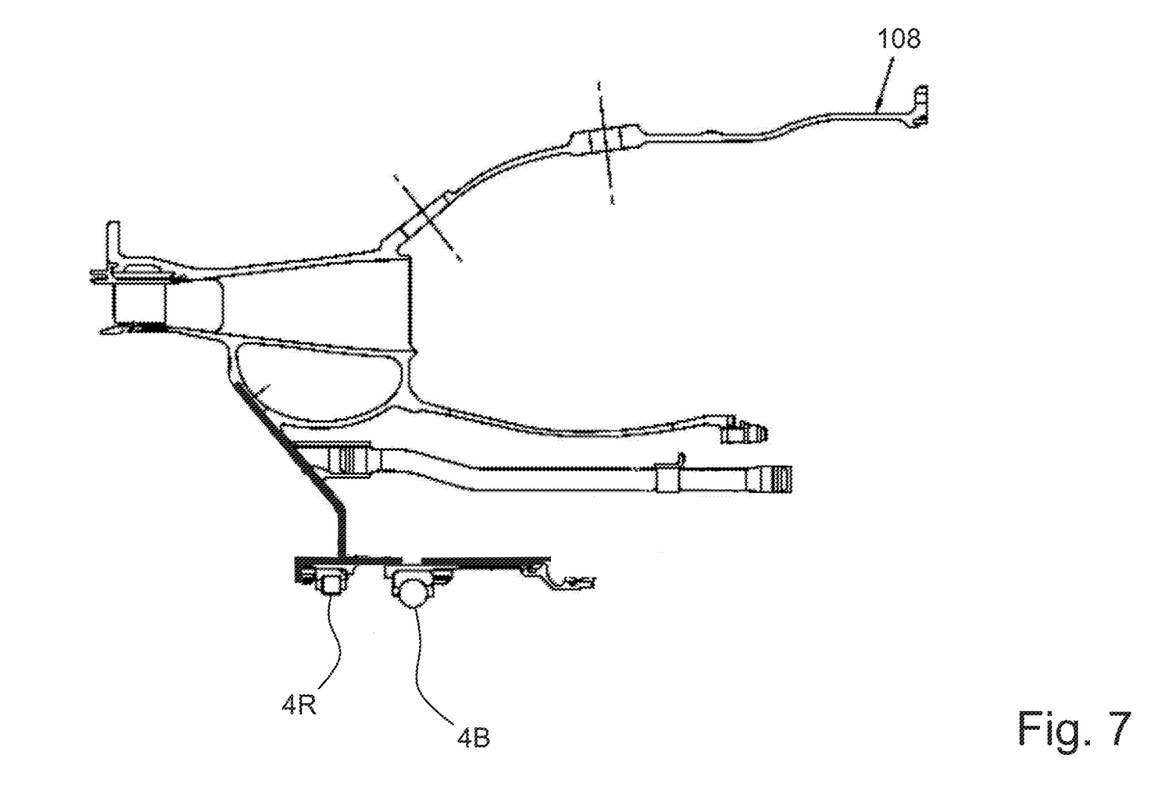

In FIGS. 6 and 7 two different stages of dismantling the aft end bearing assembly 144 are illustrated.

FIG. 6 illustrates the CRF case 108 once steps a) and b) are completed. This means that the turbine has been removed from the compressor rear frame case 108 and the aft end bearing housing 130 has been removed, too.

FIG. 7 illustrates the situation once step c) is completed and the aft sump housing 140 is removed.

Figure 8:
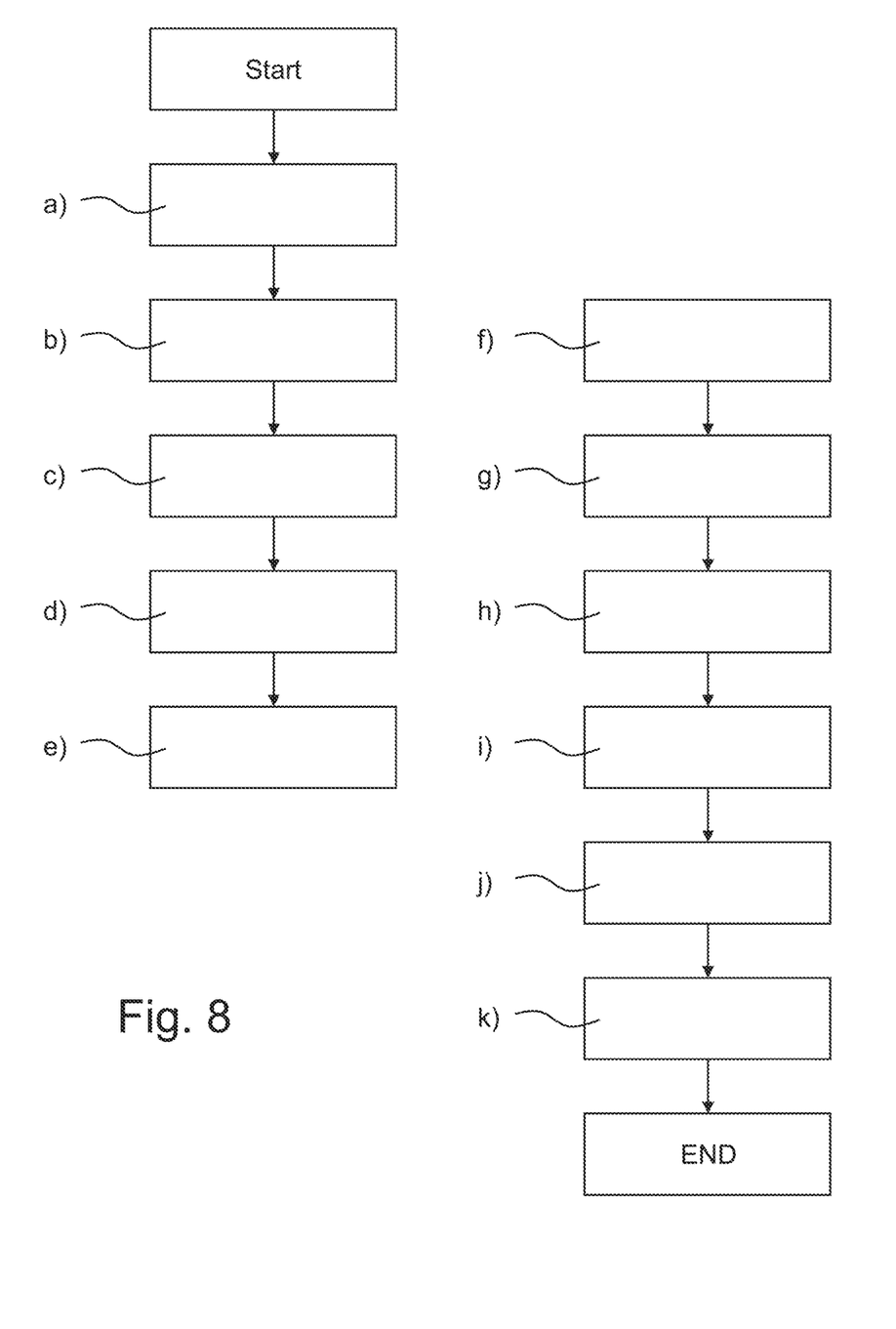
FIG. 8 is a flowchart of the method described herein.

FIG. 8 shows in a block scheme the sequence of the steps a) to e) of the method described herein.

The method may comprise the steps of replacing the oil manifold outside the CRF case 108 and subsequently reinstalling the gas turbine as in the steps f) to k). These steps are illustrated in FIG. 8, too.

In some cases, the oil manifold can be repaired inside the CRF case, for example if one broken line has to be replaced by dismantling it and by brazing a new line into the oil manifold.

The invention claimed is:

1. A method for repairing in-situ a gas turbine having a damaged oil manifold, the gas turbine comprising a compressor, a combustor and a turbine, and a compressor rear frame case between the compressor and the turbine, wherein the combustor, a front end bearing assembly, and an aft end bearing assembly are located inside the compressor rear frame case,
   wherein the front end bearing assembly includes at least one axial bearing and at least one radial bearing, and the aft end bearing assembly includes at least one radial bearing, the front end bearing assembly further including a front end bearing housing, and the aft end bearing assembly including an aft end bearing housing,
   wherein the compressor comprises a rotor with a bearing journal at least on an outlet end of the compressor that is borne by the at least one radial bearing inside the front end bearing assembly,
   wherein the turbine comprises a rotor with a bearing journal on at least an inlet end of the turbine rotor that is borne by the at least one radial bearing in the aft end bearing assembly,
   wherein the bearing journal at the outlet end of the compressor rotor and the bearing journal at the inlet end of the turbine rotor are detachably connected, and
   wherein the damaged oil manifold is attached to a forward sump housing for feeding oil to the front end bearing assembly, the method comprising the steps of:
   a) removing the turbine from the compressor rear frame case while leaving the compressor rear frame case installed in the gas turbine;
   b) removing the aft end bearing housing from the compressor rear frame case while leaving the compressor rear frame case installed in the gas turbine;
   c) removing an aft sump assembly from the compressor rear frame case while leaving the compressor rear frame case installed in the gas turbine, the aft sump assembly including an aft sump housing;
   d) removing the damaged oil manifold, an oil supply, and air tubes from the compressor rear frame case while leaving the compressor rear frame case installed in the gas turbine;
   e) removing a sump closure and a lube oil nozzle;
   f) installing a replacement oil manifold to the aft sump assembly, wherein the replacement oil manifold is one of a repaired oil manifold or a new oil manifold;
   i) installing the aft sump assembly and a bearing closure;
   j) installing the aft end bearing housing to the compressor rear frame case, and
   k) installing the turbine to the compressor rear frame case.

2. The method according to claim 1, wherein step a) further comprises disconnecting the turbine rotor from the compressor rotor.

3. The method according to claim 1 wherein step c) further comprises removal of the aft sump assembly together with at least one bearing from one of the front end bearing assembly and the aft end bearing assembly, or together with the sump closure.

4. The method according to claim 1, wherein step d) further comprises:
   removal of brackets, clamps and the air tubes from the compressor rear case frame,
   disconnecting the damaged oil manifold from an oil impingement tube on a sump vent tube,
   disconnecting the damaged oil manifold from an oil nozzle fitting of a forward sump and from a forward sump tube,
   removal of bolts, nuts, washers and clamps, and
   removal of the damaged oil manifold from the forward sump housing inside the compressor rear frame case.

5. The method according to claim 1 wherein step e) is executed outside the compressor rear frame case.

6. The method according to claim 1 wherein step e) comprises removal of an aft sump closure and a retainer ring.

7. The method according to claim 1 further comprising the steps of:
   g) installing recoup tubes and brackets, and
   h) executing a leak check procedure for the replacement oil manifold.

8. The method according to claim 7, wherein step f) further comprises:
   securing the replacement oil manifold onto an oil supply tube;
   securing the replacement oil manifold onto an oil nozzle fitting of the forward sump housing,
   securing the replacement oil manifold onto an oil impingement tube on a sump vent tube.

9. The method according to claim 7, wherein step h) further comprises:
   mounting a pressure test port blank to the replacement oil manifold.

10. The method according to claim 7, wherein step h) further comprises:
applying compressed air to the replacement oil manifold and
checking all connections of the replacement oil manifold by applying lubricating oil or a water soap mixture.

11. The method according to claim 1, wherein step i) further comprises:
lubricating an aft outside diameter of the forward sump housing and
lubricating a forward inside diameter of the aft sump housing and
putting a new piston ring on an outside diameter of the forward sump housing at a distance from a thickening belt on the forward sump housing.

12. The method according to claim 1, wherein step i) further comprises:
installing an oil supply line and an oil scavenge line to the aft sump housing.

13. A method for repairing in-situ a gas turbine having a damaged oil manifold, the gas turbine comprising a compressor, a combustor and a turbine, and a compressor rear frame case between the compressor and the turbine, wherein the combustor, a front end bearing assembly including a front end bearing housing, and an aft end bearing assembly including an aft end bearing housing are located inside the compressor rear frame case, wherein the front end bearing assembly further includes at least one axial bearing and at least one radial bearing, and the aft end bearing assembly further includes at least one radial bearing, wherein the compressor comprises a rotor with a bearing journal at least on an outlet end of the compressor that is borne by the at least one radial bearing inside the front end bearing housing, wherein the turbine comprises a rotor with a bearing journal on at least an inlet end of the turbine rotor that is borne by the at least one radial bearing in the aft end bearing housing, wherein the bearing journal at the outlet end of the compressor rotor and the bearing journal at the inlet end of the turbine rotor are detachably connected, and wherein the damaged oil manifold is attached to a forward sump housing for feeding oil to the front end bearing housing, the method comprising the steps of:
a) disconnecting the turbine rotor from the compressor rotor and removing the turbine from the compressor rear frame case while leaving the compressor rear frame case installed in the gas turbine;
b) removing the aft end bearing housing from the compressor rear frame case while leaving the compressor rear frame case installed in the gas turbine;
c) removing an aft sump assembly from the compressor rear frame case while leaving the compressor rear frame case installed in the gas turbine, the aft sump assembly including an aft sump housing;
d) removing the damaged oil manifold, an oil supply, and air tubes from the compressor rear frame case while leaving the compressor rear frame case installed in the gas turbine,
e) removing a sump closure and a lube oil nozzle; and
f) installing a replacement oil manifold to the aft sump assembly, wherein the replacement oil manifold is one of a repaired oil manifold or a new oil manifold;
i) installing the aft sump assembly and a bearing closure;
j) installing the aft end bearing housing to the compressor rear frame case, and
k) installing the turbine to the compressor rear frame case.

14. The method according to claim 13, wherein step c) further comprises removal of the aft sump assembly together with at least one bearing from one of the front end bearing housing and the aft end bearing housing, or together with the sump closure.

15. The method according to claim 14 wherein step d) further comprises:
removal of brackets, clamps and the air tubes from the compressor rear case frame,
disconnecting the damaged oil manifold from an oil impingement tube on a sump vent tube,
disconnecting the damaged oil manifold from an oil nozzle fitting of a forward sump and from a forward sump tube,
removal of bolts, nuts, washers and clamps, and
removal of the damaged oil manifold from the forward sump housing inside the compressor rear frame case.

16. The method according to claim 15 wherein step e) is executed outside the compressor rear frame case.

17. The method according to claim 15 wherein step e) comprises removal of an aft sump closure and a retainer ring.

18. The method according to claim 15 further comprising the steps of:
g) installing recoup tubes and brackets, and
h) executing a leak check procedure for the replacement oil manifold.

19. The method according to claim 18, wherein step f) further comprises:
securing the replacement oil manifold onto an oil supply tube;
securing the replacement oil manifold onto an oil nozzle fitting of the forward sump housing,
securing the replacement oil manifold onto an oil impingement tube on a sump vent tube.

20. The method according to claim 18 wherein step h) further comprises:
mounting a pressure test port blank to the replacement oil manifold,
applying compressed air to the replacement oil manifold and
checking all connections of the replacement oil manifold by applying lubricating oil or a water soap mixture.

* * * * *